(12) United States Patent
Eytan et al.

(10) Patent No.: US 6,865,142 B2
(45) Date of Patent: Mar. 8, 2005

(54) METHOD FOR TRACKING DATA IN AN OPTICAL STORAGE MEDIUM

(75) Inventors: Ori Eytan, Jerusalem (IL); Ortal Alpert, Jerusalem (IL); Yair Salomon, Jerusalem (IL)

(73) Assignee: Mempile Inc., Wilmington, DE (US)

( * ) Notice: Subject to any disclaimer, the term of this patent is extended or adjusted under 35 U.S.C. 154(b) by 499 days.

(21) Appl. No.: 10/096,369

(22) Filed: Mar. 13, 2002

(65) Prior Publication Data

US 2003/0174594 A1 Sep. 18, 2003

(51) Int. Cl.[7] .................................................. G11B 7/00
(52) U.S. Cl. ............................... 369/44.29; 369/44.26; 369/44.35; 369/94
(58) Field of Search ..................... 369/44.26, 44.29, 369/44.32, 44.34, 44.35, 44.36, 44.37, 44.41

(56) References Cited

U.S. PATENT DOCUMENTS

| | | | |
|---|---|---|---|
| 5,325,342 A | | 6/1994 | Vo-Dinh |
| 6,009,065 A | | 12/1999 | Glushko et al. |
| 6,034,929 A | * | 3/2000 | Jacobowitz et al. .......... 369/94 |
| 6,115,333 A | * | 9/2000 | Igarashi .................... 369/44.27 |
| 6,233,210 B1 | | 5/2001 | Schell |
| 6,291,132 B1 | | 9/2001 | Glushko et al. |
| 6,738,322 B2 | * | 5/2004 | Amble et al. ............. 369/44.37 |
| 2001/0002895 A1 | | 6/2001 | Kawano et al. |
| 2001/0040844 A1 | | 11/2001 | Sato et al. |

FOREIGN PATENT DOCUMENTS

WO  WO 01/73779 A2  10/2001

* cited by examiner

*Primary Examiner*—Thang V. Tran
*Assistant Examiner*—Bach Vuong
(74) *Attorney, Agent, or Firm*—Browdy and Neimark, P.L.L.C.

(57) ABSTRACT

A method and system for correcting tracking errors in an optical storage medium having multiple tracks arranged in different layers of the optical storage medium, directs a reading spot that is nominally focused on to a track in the optical storage medium, and continually moves the reading spot in axial and radial directions so as to receive a signal having an amplitude which varies according to respective offsets from the track in radial and axial directions. The received signal is used to determine a direction of a respective offset from the track in radial and axial directions, and a location of the reading spot is adjusted accordingly.

16 Claims, 4 Drawing Sheets

METHOD FOR TRACKING DATA IN AN OPTICAL STORAGE MEDIUM

FIELD OF THE INVENTION

This invention relates to the avoidance of tracking errors in an optical storage system

BACKGROUND OF THE INVENTION

In optical storage media such as optical disks in general and DVDs in particular, data is stored along tracks formed in the bulk of the optical disk and is read by focusing a laser beam produced by semiconductor diodes on to the tracks, while spinning the disk on its axis. The tracks generally comprise spiral tracks on which data is written and from which the data is read.

Obviously in order to read data correctly it is essential that the reading head can locate and follow a desired track. In practice this leads to two different kinds of tracking problem: skipping from one track to another and faithfully following a single track. The first problem must be addressed, for example, when data is read from or written to a first track and the user selects a different track for reading data therefrom or writing data thereto. The second problem must be addressed when data is being read from or written to a required track, in order to ensure that data is not inadvertently read from or written to an adjacent track. For the purpose of the present discussion, it suffices to observe that these two different tracking problems require different solutions and the present invention is concerned only with the second of the two problems.

In a CD data is written on a single surface only, while in a DVD data is written on two surfaces. However, the manner in which data is read from both media is essentially the same in that a single laser beam is focused to a spot on the writing surface and tracks the data thereon. In both cases, the data is recorded in tracks which are typically spiral. In the case of CDs, where data is recorded on a single layer only, the laser beam is focused to the refractive plane. Against this, in DVDs where data is recorded on two layers, the read/write head is adapted to be raised or lowered in order that the laser beam be focused on the correct layer. However, once this is done, planar tracking is performed in a similar manner to CDs.

The manner in which the reading head tracks a destination track is based on focusing the reading spot on to the track and measuring the intensity of a reflected spot by position sensitive detectors. This allows calculation of the position of the reading spot and subsequent adjustment of the reading head's location based on the measured error.

US20010040844A1 published Nov. 15, 2001 (Sato et al) entitled "Tracking servo apparatus of optical information recording and reproducing apparatus" discloses a tracking servo apparatus using this technique. Thus, reflection light obtained when a laser beam is irradiated onto a recording surface of an optical disc is photoelectrically converted, thereby obtaining a photoelectric conversion signal. A tracking error signal showing an amount of deviation of an irradiating position of the laser beam for a track in a disc radial direction on the recording surface is generated by the photoelectric conversion signal. A spherical aberration occurring in an optical system is detected, a level of the tracking error signal is corrected on the basis of the detection result, and the irradiating position of the laser beam is moved in the disc radial direction in accordance with the level-corrected tracking error signal.

Likewise, U.S. Pat. No. 6,233,210 published May 15, 2001 (Schell; David L.) entitled "Optical drive error tracking method and apparatus" discloses a method and apparatus for obtaining a tracking error signal for an optical disk player which is general across the various data formats found in CD audio disks and DVDs. A photodetector having at least four active areas is used to sense the reflected laser beam. A differential amplitude tracking error signal is generated by comparing the signal strength in the different active areas.

These references are typical of known solutions for maintaining the read/write head in communication with a desired track using a photodetector having multiple sections that serves as a position-sensitive detector for detecting a component of the read/write laser beam reflected from the surface of the optical disk.

For both CDs and DVDs, axial compensation translates to a focusing adjustment of the read/write beam.

SUMMARY OF THE INVENTION

It is an object of the invention to provide a method and system for correcting tracking errors in an optical storage medium where the read/write spot may drift in two orthogonal directions.

According to a broad aspect of the invention there is provided a method for correcting tracking errors in an optical storage medium having multiple tracks arranged in different layers of the optical storage medium, the method comprising:

(a) directing a reading spot that is nominally focused on to a track in the optical storage medium, (b) continually moving the reading spot in axial and radial directions, (c) receiving a signal having an amplitude which varies according to respective offsets from the track in radial and axial directions, (d) using the received signal to determine a direction of a respective offset from the track in radial and axial directions, and (e) adjusting a location of the reading spot accordingly.

Such a method is particularly suited for use by a tracking system in a data storage medium based on a disk that contains data in a form of spiral or circular shaped layers of patterns. Moreover, the disk may store the data as 3-D patterns in the bulk of the storage medium as opposed the manner in which data is stored in CDs and DVDs where the data is stored on substantially planer tracks and the patterns are thus substantially planar. In the case where data is stored as 3-D patterns, the patterns may be termed "voxels". Each voxel can modulate or respond in another manner to a laser beam or a pair or a triad of laser beams traveling through it, in a linear or nonlinear proportion to the data stored in that voxel (typically a small number of bits). The invention enables tracking a specific spiral track in a specific layer by the reading signal of the device and reading the data in the correct order.

Moreover, the method according to the invention may also be used to track data in an optical storage medium where data is stored in the bulk of the storage medium on multiple tracks that are packed closely and which are written and read using two laser beams that intersect thus defining a volume of intersection that writes to or reads from a desired track.

The purpose of the invention is to track the patterns' spiral in r and z coordinates when the disk rotates. It is assumed that the track suffers limited amount of run-out both in r (radial run-out) and z (axial run-out) coordinates. Such distortions can occur in the event that the axis of rotation is slightly off the disk center and slightly non-parallel to the disk plane normal, such that the data spiral moves relative to the reading spot while the disk rotates. The invention enables tracking the data spirals by calculating a tracking error signal that is used as a feedback for the servomechanisms that control the r and z position.

The basic principle is to perpetually move (modulate) the reading spot in a periodical path around its nominal current position (traveling the r-z plane by two orthogonal functions of time). This modulation causes a modulation in amplitude and phase of the read signal that depends on the position of the reading spot relative to the data spiral. This dependence is used to determine the tracking error.

As a simplified example of the way the algorithm calculates an error signal, consider a 2-D case. Assume the z coordinate is fixed such that the lasers spot is focused at the proper height and there is no axial run-out. As the reading spot propagates along the track, the spot's radial position is modulated in the radial direction so that the spot is half the time in (towards the center of the disk) and half the time out relative to the track (i.e. $r < r_o$ half of the time and $r > r_o$ half of the time). It should be noted that the offset relative to track center has to be small to ensure that signal is still detected with a signal to noise ratio that is high enough for other functions such as symbol detection or synchronization to be accomplished. If the signal has a fixed average and the tracking is perfect, than the average of the 'in' signal (signal detected when spot is 'in' relative to the track) is equal to the 'out' signal. If the spot's position begins to diverge from the track's position e.g. because of eccentricity of the disk, the expansion of the spiral or some other reason, then the difference between the 'in' and 'out' parts of the modulated signal, out-in, is negative if there were a small 'run-out' or positive if there was 'run-in'.

Two main factors determine the frequency of the modulation. It should be high enough to be able to respond to fast changes of the relative location of the is track and the spot, but low enough to average enough patterns so that the signal will be independent of the stored data. The averaging of the data can be accomplished by window integration or other appropriate low pass techniques. To ensure that in each integration window the signal is data-independent, DC free encoding techniques are used.

In another embodiment of the invention the error signal calculation is accomplished by multiplying (inner product) the time variation of the data envelope (the read signal) with the reading spot modulation function. In this scheme the error signal is weighted by the strength of the modulation, i.e. signal measured when the amplitude of the modulation is high contribute more to the error signal. Further refinement of the invention is to include delay compensation before the multiplication between the signal and the modulation.

The tracking errors are used as feedback signals for the servo machine controlling the nominal spot position.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

Figure 1:
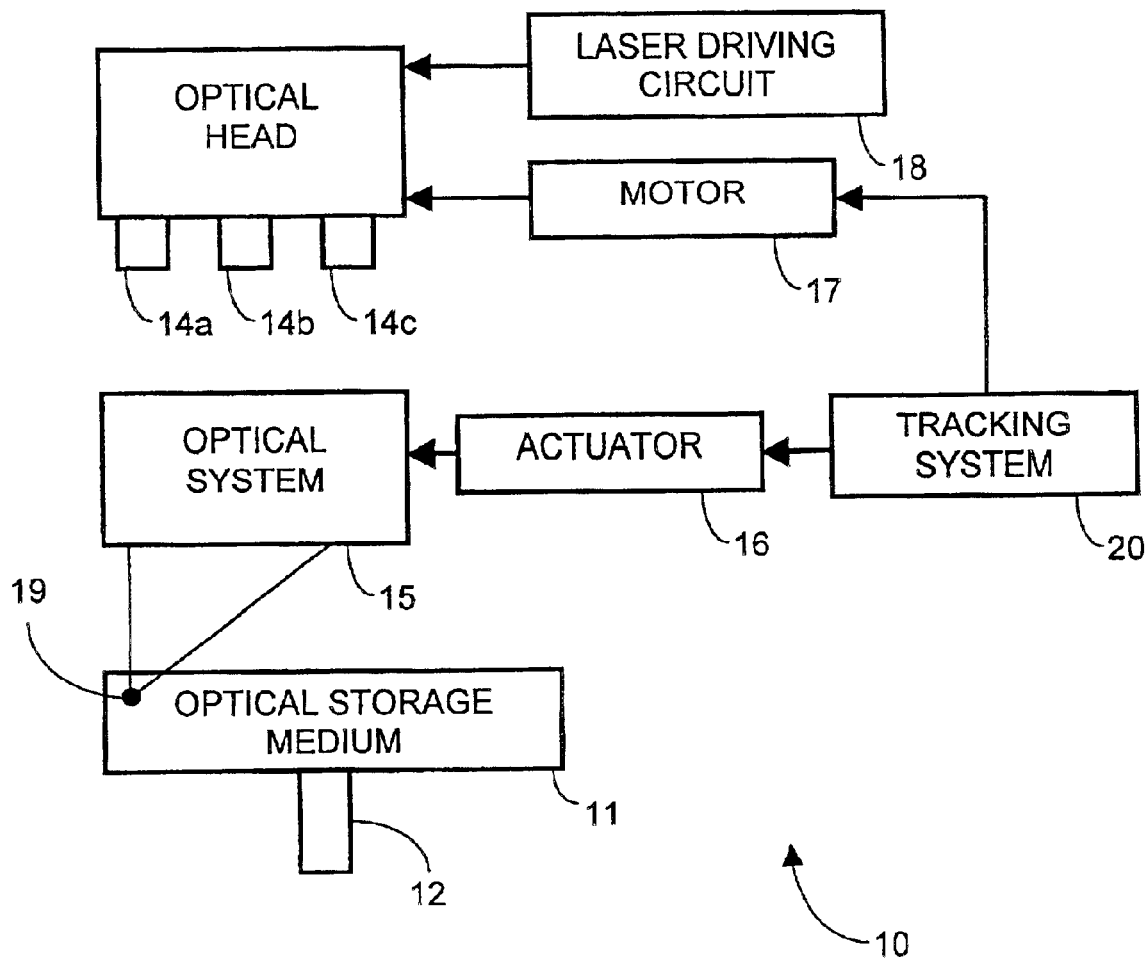
FIG. 1 is a block diagram showing functionally a read/write system according to the invention.

Referring to FIG. 1 there is shown functionally a read/write system 10 for a 3-D optical storage medium 11. The read/write system 10 comprises a rotary shaft 12 driven by an appropriate driving motor (not shown) for rotating the optical storage medium 11 set thereon, and an optical head 13 for writing information on to or reading information from one of the tracks in the optical storage medium 11.

The optical head 13 comprises semiconductor lasers 14a and 14b for radiating a pair of intersecting light beams having a volume of intersection that forms a "spot" used in reading information mode and a semiconductor laser 14c used with 14a in writing mode. An optical system 15 creates a focused spot whose location is controlled by actuator 16. The optical head 13 is driven by a motor 17.

The system further comprises a laser driving circuit 18 for energizing the semiconductor lasers 14a, 14b and 14c to emit the respective laser beams.

In order to write/read information to/from a desired track 19 on the optical storage medium 11, the small beam spots must be kept on the desired track. To this end, the system is provided with a tracking servo system shown generally as 20, which feeds a correction signal to the lens actuator 16 for moving the optical system 15 under control of the tracking error signal to nominally position the beam spots at the center of the track so that the tracking error signal is zero.

Figure 2A:
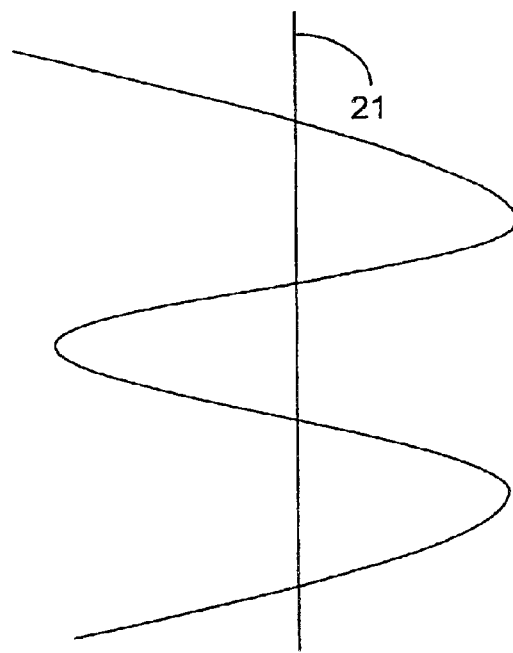
FIGS. 2a and 2b are pictorial representations showing the effect of sinusoidally modulating the position of the reading head in the system of FIG. 1.
Figure 2B:
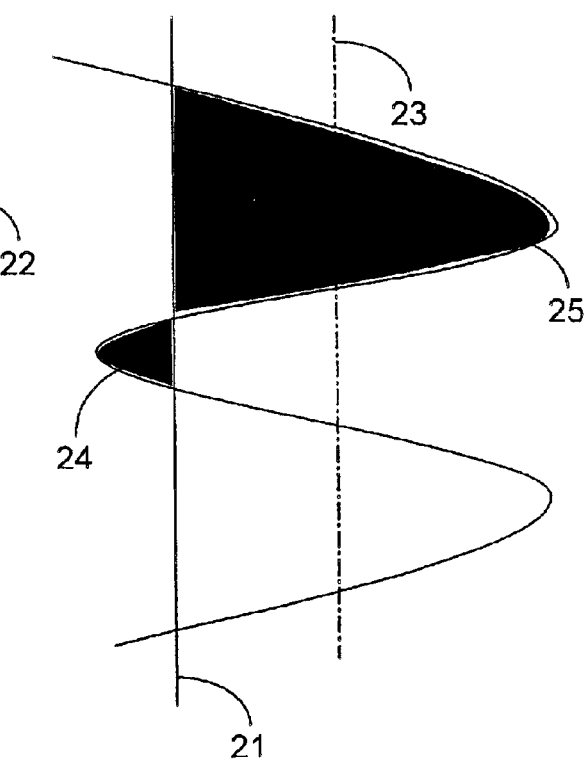

FIGS. 2a and 2b shows pictorially the effect of sinusoidally modulating the position of the optical head 13 in the system of FIG. 1. So far as the reading spot is concerned it tracks data written into a continuous linear data track 21 while being subjected to spatial modulation that shifts its position continually from one side of the track to the other. Although the data is stored in tracks, the invention relies on the principle that even if the optical head 13 is off-center, data signal will still be read, albeit at reduced intensity. Thus, the further off-center the optical head 13 is moved, the lower will be the magnitude of the data signal.

Thus, with reference to FIG. 2a, consider the case where the tracking is perfect and the reading spot is symmetrical with respect to the data track 21, its position being shown by the sinusoidal curve 22. In this case, the average signal read by the optical head 13 will be equal on both sides of the data track 21. However, in the case of imperfect tracking as shown in FIG. 2b, the reading spot is asymmetrical with respect to the data track 21, its actual line of symmetry being depicted by a dotted center-line 23, shown to right of the data track 21. The signal is inversely proportional, in perhaps a non-linear fashion, to the distance of the sinusoidal curve 22 from the data track 21. Thus, in FIG. 2b where the sinusoidal curve 22 is offset to the right of the data track, this results in a lower signal from samples made when the sinusoidal curve 22 is to the right of the center line 23, thus indicating the spot is offset to the right of the data track 21 and must therefore be shifted to the left in order to correct the offset.

The invention operates on the principle that by continually reading the data and, at the same, continually modulating the position of the reading head, the resulting moving average signal intensity that is read may be used to indicate to which side, both axially and radially, the reading head is located. This having been determined, the reading head may then be moved in an opposite direction until it is found to be disposed symmetrically relative to the track in both axial and radial directions.

Figure 3:
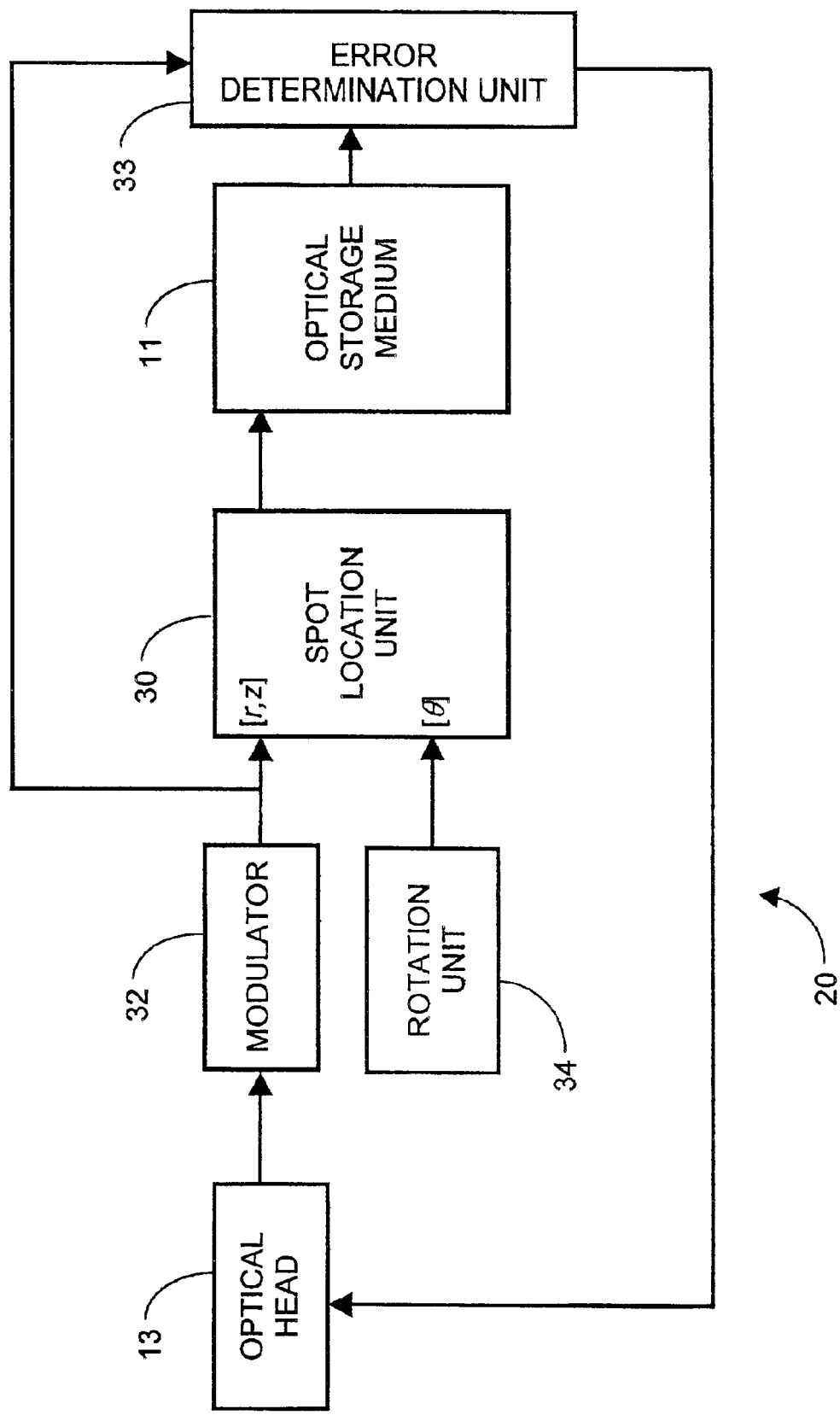
FIGS. 3 and 4 are block diagrams showing details of a tracking system for use with the read/write system shown in FIG. 1.
Figure 4:
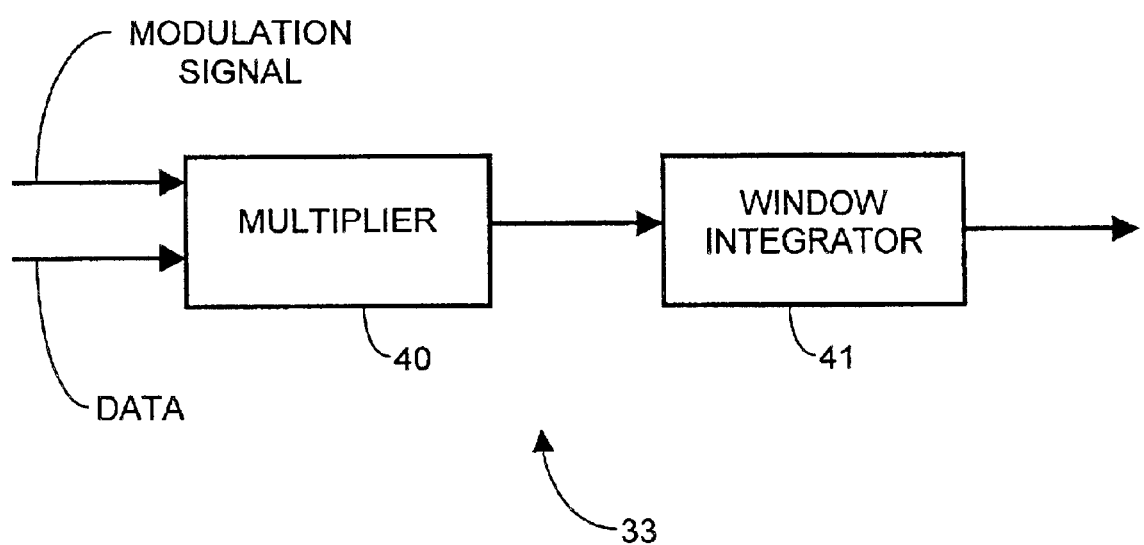

FIGS. 3 and 4 are block diagrams showing functionally details of a tracking system 20 that is described in polar coordinates (r, θ, z) defining a position of the beams' intersection in the optical recording medium. The tracking system behaves substantially identically for both radial and axial tracking. A spot location unit 30 is responsive to a pair of inputs (r, z) and θ derived from the modulated position of the optical head 13 for generating a vector (r, θ, z) defining the instantaneous position of the reading/writing spot so as to read the data signal at this coordinate in 3-D space.

A modulator 32 spatially modulates the location of the optical head 13 by a (r, z) modulation signal and feeds the resulting modulated data signal to the spot location unit 30. The modulation signal itself is fed together with the measured data signal to an error determination unit 33, whose output is an error signal that is fed back to the optical head 13 to correct the axial and radial offsets thereof. A rotation unit 34 provides a continuous change of θ.

FIG. 4 shows in simplified form the principal functionality of the error determination unit 33 comprising a first 2-input multiplier 40 to whose first input the (r, z) modulation signal is fed and to whose second input is fed the data signal read by optical head 13 at the position (r, θ, z) in the optical storage medium 11. An output of the multiplier 40 is fed to a window integrator 41 which integrates the product of the data signal with the modulation signal so as to generate at its output a composite (r, z) error signal in the radial and axial directions.

As described above by way of example with reference to FIG. 2 of the drawings, the modulation signal can be a sinusoidal function of the form m=sin ($\omega_o$t) The output of the window integrator may then be represented by:

$$err(t) = \int_{t-T}^{t} mI(t)\,dt$$

The intensity is inversely proportional in a non linear fashion to the distance from the center of the track. Thus, when the head is above the center of the track the modulation intensity is strongest, and it decays to zero when the head moves far from it. "T" represents the length of the time window of the integrator during which the modulated intensity is averaged. "T" should not be so large that it impacts negatively on the reaction time and creates distortions; but neither should it be too low since it is very difficult to construct a mechanical scanning system.

However, the modulation signal can be any suitable cyclic function which serves to move the optical head 13 on either side, in both axial and radial directions, of the reading spot. Thus, it can be a square wave function or any other suitable cycle function. It is assumed that the frequency of the modulation signal is much lower than the frequency at which data is read. The window integrator 41 thus operates as a low pass filter, which filters out the modulation signal, letting the averaged amplitude of the data signal pass.

The heart of the invention resides in the active modulation of the location of the reading spot and subsequent low pass filtering of the data signal effected by the error determination unit 33 to generate a compound error signal representative of the respective directions of the offsets from the track in radial and axial directions, which serve to correct the position of the optical head so as to direct the focused spot on the track.

Whilst the invention has been described with particular regard to a tracking system for use with a 3-D optical storage medium wherein data is stored as voxels written in the bulk of the material, it will be understood that the principles of the invention are equally applicable to other kinds of optical storage media where data is stored in a substantially planar fashion.

It should also be noted that while two intersecting beams may be employed, the tracking system according to the invention may be used with a single beam as well as with more than two intersecting beams.

In the method claims that follow, alphabetic characters and Roman numerals used to designate claim steps are provided for convenience only and do not imply any particular order of performing the steps.

What is claimed is:

1. A method for correcting tracking errors in an optical storage medium having multiple tracks arranged in different layers of the optical storage medium, the method comprising:

(a) directing a reading spot that is nominally focused on to a track in the optical storage medium, (b) continually moving the reading spot in axial and radial directions, (c) receiving a signal having an amplitude which varies according to respective offsets from the track in radial and axial directions, (d) using the received signal to determine a direction of a respective offset from the track in radial and axial directions, and (e) adjusting a location of the reading spot accordingly.

2. The method according to claim 1, wherein step (a) includes directing at least two light sources whose volume of intersection constitutes the reading spot.

3. The method according to claim 1, wherein step (b) includes modulating a position of the reading spot with a cyclic function.

4. The method according to claim 2, wherein step (b) includes modulating a position of the reading spot with a cyclic function.

5. The method according to claim 3, wherein the cyclic function is substantially sinusoidal.

6. The method according to claim 4, wherein the cyclic function is substantially sinusoidal.

7. The method according to claim 1, wherein step (c) includes:

i) reading a data signal with the reading spot, ii) multiplying the data signal by a cyclic modulation signal to form a modulated data signal, and iii) low pass filtering the modulated data signal.

8. The method according to claim 7, wherein step (iii) includes window integrating the modulated data signal.

9. An error correction device for correcting tracking errors in an optical storage medium having multiple tracks arranged in different layers of the optical storage medium that are read by a focused reading spot directed by an optical head to a track in the optical storage medium, the error correction device comprising:

a position modulator for modulating a position of the reading spot, an error unit for receiving a data signal having an amplitude which varies according to respective offsets from the track in radial and axial directions, and is responsive to the data signal to determine a direction of a respective offset from the track in radial and axial directions, which offsets may be fed to the optical head to correct radial and axial position errors of the reading spot.

10. The device according to claim 9, wherein the reading spot is a volume of intersection of at least two light sources focused on the track.

11. The device according to claim 9, wherein the position modulator modulating a position of the reading spot with a cyclic function.

12. The device according to claim 10, wherein the position modulator modulating a position of the reading spot with a cyclic function.

13. The device according to claim 11, wherein the cyclic function is substantially sinusoidal.

14. The device according to claim 12, wherein the cyclic function is substantially sinusoidal.

15. The device according to claim 9, wherein the error unit includes:

a multiplier for multiplying the data signal by a cyclic modulation signal to form a modulated data signal, and a low pass filter for low pass filtering the modulated data signal.

16. The device according to claim 15, wherein the low pass filter is a window integrator.

* * * * *